United States Patent Office 3,247,145
Patented Apr. 19, 1966

3,247,145
HYDROXY COPOLYMERS PREPARED IN CARBOXYLIC ACIDS
John E. Masters and Darrell D. Hicks, Louisville, Ky., assignors, by mesne assignments, to Celanese Coatings Company, a corporation of Delaware
No Drawing. Filed Dec. 24, 1962, Ser. No. 246,676
9 Claims. (Cl. 260—23)

This application is a continuation-in-part of our co-pending U.S. patent application Serial No. 12,280, filed March 2, 1960.

This invention pertains to the preparation of hydroxy-polymers. It is particularly related to processes for the formation of solutions of hydroxy-polymers which are capable of being readily cross-linked and to methods for preparing molded articles or castings from such polymer solutions.

Hydroxy-polymers are well known homopolymers and copolymers containing hydroxy groups. They are generally prepared by the polymerization of unsaturated alcohols or hydroxy esters by solution or emulsion polymerization techniques.

In emulsion polymerization, the drying of the coagulum is difficult because of the great tendency of the polymer to coalesce. Subsequent mastication with cross-linking agents is difficult. Accordingly, emulsion polymerized hydroxy copolymers are generally used as film forming materials rather than in pottings, castings and the like.

Solution polymerization of monomers containing hydroxyl groups and other unsaturated comonomers to form hydroxy copolymers does not lend itself to the formation of molded articles because of the difficulty of removing the solvent. Even when a low boiling solvent such as acetone is used, it is difficult to form castings free of entrained solvent or of bubbles resulting from solvent liberation. The presence of volatile solvent thus has prohibited an extensive use of hydroxy-substituted copolymers in the pottings and castings fields.

By the practice of this invention, a process is provided for the preparation of solutions of hydroxy polymers for applications heretofore not practical through the use of polymer solutions. In accordance with this invention, the monomers are polymerized in the presence of a reactive solvent. By "reactive solvent" is meant a non-volatile solvent in which the polymer is soluble at polymerization temperatures and which reacts with the polymer and/or a cross-linking agent for the polymer under curing conditions, that is, at curing temperatures and, if necessary, in the presence of a catalyst. It is understood, however, that under polymerizing conditions the solvent and the monomers are substantially non-reactive with each other. In other words, the polymerization medium is a solvent which does not react with the monomer or the polymer during polymerization, but which reacts either with the polymer or the cross-linking agent or both when the temperature is raised above the polymerization temperature generally in the presence of a catalyst.

Polymer solutions are thus formed which can be mixed with cross-linking agents to form cured materials without the need for solvent liberation. This not only renders the polymer solution particularly suitable for pottings, castings, encapsulations, and the like, but also provides a convenient reaction medium for making high polymers which otherwise would be of little value in the formation of shaped articles because of their extreme viscosities.

Reactive solvents which are employed in accordance with the practice of this invention are saturated carboxylic acids, alcohols, and epoxides, each boiling at 150° C. or above, and each being liquid at the polymerization temperature employed, that is, they have melting points below the polymerization temperature used, generally 60° C. to 150° C. The viscosity of the solvents should not be greater than 130 centipoises at the polymerization temperature. Of acids, alcohols and epoxides serving as reactive solvents herein, monocarboxylic acids, monohydric alcohols, and monoepoxides are suitable, but polycarboxylic acids, polyhydric alcohols, and polyepoxides are preferred. However, so long as they meet the boiling point, melting point and viscosity requirements, there is no reason why any of these cannot be employed. Suitable saturated monocarboxylic acids are benzoic acids, butyric acid, capric acid, caproic acid, myristic acid, palmitic acid, nonadecylic acid and the like having not over eighteen carbon atoms.

Since some acids such as succinic acid having melting points above 150° C. nevertheless form liquid solutions at the reaction temperature, suitable acids are polycarboxylic acids which form liquid solutions with the monomers at the reaction temperatures employed. Among the preferred polycarboxylic acids are dicarboxylic acids and particularly mixtures of such dicarboxylic acids, as well as dimerized or trimerized fatty acids. In addition to succinic acid, other polycarboxylic acids can be used, for example, glutaric acid, sebacic acid, isosuccinic acid, tetrahydro o-phthalic acid, hexahydrophthalic acid, hexachloroendomethylenetetrahydrophthalic acid, dimerized soybean oil acids, adipic acid, and the like. As additional polycarboxylic acids, examples are malonic acid, pimelic acid, suberic acid, azelaic acid, o-phenylenediacetic acid, m-phenylenediacetic acid, and p-phenylenediacetic acid. Other monocarboxylic acids within the contemplation of this invention are phenylacetic acid, hydrocinnamic acid, and $\gamma$-phenylbutyric acid.

Monohydric alcohols which are used in accordance with the invention are those which cannot readily be liberated by heating the polymer after it is made, such as stearyl alcohol, lauryl alcohol, and the like. Generally, saturated aliphatic alcohols having from ten to eighteen carbon atoms, such as decyl alcohol, myristyl alcohol, octadecyl alcohol, etc., will be most used. While saturated acids and alcohols are usually employed, it is noted that whether unsaturated alcohols and acids are usable depends on the reactivity of the double bond under polymerization conditions. Thus, fatty acids of the drying oil type such as soya, linseed, and oleic acids can be used. Likewise, linolyl, farnesol, oleyl and similar higher fatty alcohols which are not readily polymerizable can be used.

Of the alcohols, saturated polyhydric alcohols having one to four hydroxyl groups are preferred. Particularly suitable are the high molecular weight polyglycols. However, the glycols, glycerin, trimethylol propane and the like can be used. Suitable glycols, are for instance, ethylene glycol, propylene glycol, diethylene glycol, 1-5-pentanediol, tripropylene glycol, dipropylene glycol, tetraethylene glycol, triethylene glycol, etc. It is understood that glycols as used herein include both the dihydric alcohols and the dihydric ether alcohols. Thus, the commercially available "Carbowaxes" are contemplated. These are mixtures of polyoxyethylene glycols. Those mixtures having average molecular weights of from 200 to 1000 are particularly desirable. The polyoxypropylene glycols are also contemplated.

The third class of reactive solvents is the saturated mono- and polyepoxides, particularly mono- and polyglycidyl ethers and esters derived from phenols, alcohols and acids. Examples of monoepoxide solvents are such monoepoxides as styrene oxide, glycidol, phenyl glycidyl ether, glycidyl acetate, glycidyl benzoate, butyl glycidyl ether and the like.

Among the polyepoxides which can be used as reactive solvents are glycidyl polyethers of polyhydric alcohols and polyhydric phenols prepared by reacting the alcohol or phenol with a halohydrin such as epichlorhydrin in the presence of an alkali. These are well known ethoxyline resins and are described in such patents as U.S. 2,467,171, U.S. 2,538,072, U.S. 2,582,985, U.S. 2,615,007, U.S. 2,698,315 and U.S. 2,581,464. In addition to glycidyl ethers, epoxy esters are included. Desirable epoxy esters can be made by the epoxidation of unsaturated esters by reaction with a peracid such as peracetic acid or performic acid, a desirable ester thus prepared being, 3,4-epoxy-6-methyl cyclohexyl-methyl-3,4-epoxy-6-methylcyclohexanecarboxylate,

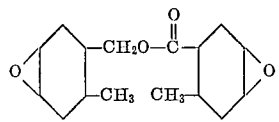

Other epoxides are also included, for example, epoxidized drying oils, and epoxidized aliphatic and alicyclic compounds. Examples are epoxidized soya oil, epoxidized linseed oil, epoxidized polybutadiene and epoxycyclohexene carboxylic acid esters.

It is noted that the reactive solvent need not be a liquid at room temperature. It is necessary only that it have a viscosity of not more than 130 centipoises at the polymerization temperature. It is a low melting compound which will be liquid at the polymerization temperature. The reactive solvents set forth hereinbefore make excellent reaction media. In some cases upon cooling, crystalline solids result which can be readily liquified on heating. If desired, the solid polymer-solvent compositions can be pulverized for convenience in use.

Methods of polymerizing the hydroxy monomer, that is, the unsaturated alcohol or hydroxy ester, with various comonomers are well known. Polymerization is effected by the conventional solution polymerization techniques, except that the polymerization medium contemplated herein is used as a solvent rather than one of the conventional volatile media. The amount of polymerization medium employed will depend upon seevral things; the viscosity of the medium, the molecular weight of the polymer made, and the solubility of the polymer in the medium. Thus, when less viscous epoxide resins or acids are employed, less will be required than when a more viscous composition, such as a polyepoxide, is used. In addition, if a low molecular weight polymer is made, not as much medium is required as when a higher molecular weight polymer is prepared. This being the case, it can best be stated that sufficient polymerization medium is used to form, at the reaction temperature, a solution of the resuling hydroxy copolymer in the polymerization medium. Generally, from 5 to 95 parts hydroxy monomer, preferably 10 to 50, are reacted with preferably 90 to 50 parts of comonomer, the polymerization reaction being carried out at temperatures of from 60° C. to 150° C., and in some cases, if desired, at a pressure slightly above atmospheric. The polymerization reaction is, of course, accelerated by the use of heat and other conditions such as a peroxide or hydroperoxide catalyst, e.g., benzoyl peroxide, cumene hydroperoxide, tertiarybutyl hydroperoxide, phthalic peroxide, acetyl peroxide, lauroyl peroxide, ditertiarybutyl peroxide, and the like.

The hydroxy monomer is generally first prepared and then polymerized with the other unsaturated monomer. However, when a hydroxy ester prepared from a monoepoxide and an unsaturated acid is to be used, such as hydroxy propyl acrylate, it can be prepared during the polymerization, if the solvent is not an epoxide. Thus, the unsaturated acid, the monoepoxide, the other monomer, and a solvent such as a glycol are all combined and reacted preferably using a polymerization catalyst and a carboxy-epoxy catalyst as shown in some of the examples.

The hydroxy substituted copolymers prepared according to this invention are formed by the reaction of a monoethylenically unsaturated monomer with an unsaturated alcohol, a hydroxy alkyl vinyl sulfide or a hydroxy ester, each containing only one double bond and one or more hydroxyl groups, and free of other reactive groups. Examples of hydroxy monomers are such esters as hydroxy ethyl acrylate, hydroxy propyl acrylate, hydroxy propyl and ethyl methacrylate, hydroxy ethyl crotonate, hydroxy propyl crotonate, acrylic and methacrylic esters of monohydric alcohol glycidyl ethers, di(hydroxyalkyl) or alkyl, hydroxyalkyl maleate and fumarate esters, and monohydric alcohol glycidyl ethers; such unsaturated alcohols as allyl alcohol, crotoyl alcohol, alpha-methyl allyl alcohol, methallyl alcohol, chloroallyl alcohol and beta-methyl crotyl alcohol; and hydroxy ethyl, hydroxy propyl, hydroxy butyl vinyl sulfides, and hydroxy octyl vinyl sulfides; and other hydroxy alkyl esters and hydroxyl alkyl vinyl sulfides, having not more than ten alkyl carbon atoms.

Polymerized with the hydroxy monomer is a monoethylenically unsaturated monomer. By a monoethylenically unsaturated monomer is intended an organic compound containing a single vinyl, vinylidene, or vinylene group, desirably a single vinyl group. Preferred monomers are liquids containing a single vinyl group attached to a negative radical and are compatible with the hydroxy monomer or soluble in the reactive diluent. Since such monomers are well known, the following are given here by way of example:

Monoolefinic hydrocarbons, that is, monomers containing only atoms of hydrogen and carbon, such as styrene, alpha-methyl styrene, alpha-ethyl styrene, alpha-butyl styrene and vinyl toluene, and the like;

Halogenated monoolefinic hydrocarbons, that is, monomers containing carbons, hydrogen and one of more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and parafluorostyrene, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, chloroethylene, (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, and the like;

Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate, methyl acrylate, ethyl acrylate, propyl acrylate, isopropyl acrylate, butyl acrylate, isobutyl acrylate, amyl acrylate, hexyl acrylate, 2-ethyl-hexyl acrylate, heptyl acrylate, octyl acrylate, 3,5,5-trimethylhexyl acrylate, decyl acrylate and dodecyl acrylate, isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alphachlorovalerate and vinyl alpha-bromovalerate;

Allyl chlorocarbonate, allyl formate, allyl acetate, allyl propionate, allyl butyrate, allyl valerate, allyl caproate, diallyl phthalate, diallyl succinate, diethylene glycol bis(allyl-carbonate), allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, diallyl-3,4,5,6,7,7-hexachloro-4-endomethylene tetrahydrophthalate, as well as methallyl esters corresponding to the above allyl esters, as well as esters from such alkenyl alcohols as beta-ethyl allyl alcohol, beta-propyl allyl alcohol, 1-buten-4-ol, 2-methyl-buten-1-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alphabromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, dibutyl maleate, dimethyl fumarate, dibutyl fumarate and diethyl lutaconate;

Organic nitriles such as acrylonitrile, methacrylonitrile, ethacrylonitrile, crotonitrile, and the like;

Acid monomers such as acrylic acid, methacrylic acid, crotonic acid, 3-butenoic acid, angelic acid, tiglic acid and the like can be used if the reactive solvent is not an epoxide;

Amides such as acrylamide, alpha-methyl acrylamide, N-phenyl acrylamide, N-methyl, N-phenyl acrylamide, and the like.

In forming the cross-linked compositions from the hydroxy copolymer solutions of this invention, if the reactive diluent is a polyepoxide, the composition can be cross-linked by the use of an anhydride thereby forming an epoxy-hydroxy-anhydride curing system. On the other hand if the hydroxy copolymer is made in the presence of an acid, it can be cured with a polyepoxide in combination with a polycarboxylic acid anhydride. And if it is made in the presence of a polyepoxide, it can be cured by the use of a polycarboxylic acid or a polycarboxyl copolymer. The polycarboxyl copolymer can be made also in a reactive solvent in accordance with copending application Serial No. 788,046 filed January 21, 1959, now abandoned. The copolymer made in the acid or in the polyepoxide can also be cured with such well known curing agents as urea-formaldehyde resins, melamine-aldehyde resins and other well known curing agents which react with hydroxyl and carboxyl or epoxide groups, such as polyisocyanates and amines.

If the copolymer is made in the presence of a polyepoxide, it is desirable to cure the hydroxy-epoxy composition with an anhydride since an anhydride affords anhydride groups for reaction with hydroxyls of the copolymer and carboxyl groups for reaction with epoxide groups of the reactive diluent. In such a system, the reactants are generally employed in ratios resulting in a cross-linked thermoset composition, usually from one to two equivalents anhydride to two equivalents polyepoxide to 0.2 to 0.8 hydroxyl equivalent copolymer. By an epoxide equivalent is means the amount, in grams, of epoxide compound containing one epoxy group. Likewise, a carboxyl or hydroxyl equivalent represents the amount, in grams, furnishing the hydroxyl or carboxyl group. An equivalent anhydride is the amount of anhydride which contains one anhydride group. If the hydroxy copolymer is made using a polycarboxylic acid as the reaction medium, it is generally preferred to add both anhydride and polyepoxide to form a carboxy hydroxy-anhydride-epoxide system. In this case the ratios will be the same as those set forth above. Such anhydride-carboxy-epoxy systems are particularly preferred when the hydroxy copolymer is made in the presence of a monofunctional reactive solvent. If the reactive solvent is a monoepoxide or monohydric alcohol, it will be necessary in order to obtain a cross-linked composition to include some polyfunctional alcohol or epoxide if an anhydride-carboxy-hydroxy-epoxide system is desired. Of course, if the hydroxy copolymer is made in a monohydric alcohol or monoepoxide, the copolymer solution can be cured by other means as through hydroxyl groups without using a carboxy-hydroxy-epoxy-anhydride system. However, since in some instances only part or none of the reactive solvent will enter into the reaction, the properties of the resulting composition will not be as good.

It is understood that in any of these systems such as the hydroxy-carboxy-anhydride system, a catalyst can be employed if desired. Generally speaking, known catalysts which are activators for carboxy-epoxy reaction can be used to increase the rate of cross-linking when this system is used, for example, inorganic and organic bases, tertiary amines, quaternary ammonium hydroxides and alkali metal or alkaline earth metal hydroxides. Examples are sodium hydroxide, calcium hydroxide, dimethyl aminomethyl phenol, benzyl dimethyl amine and the like. Particularly desirable catalysts are quaternary ammonium salts such as benzyl trimethylammonium chloride, benzyl trimethylammonium bromide, benzyl trimethylammonium acetate, tolyl trimethylammonium chloride, phenyl trimethylammonium phosphate, benzyl trimethylammonium oxalate, and trimethylbenzyl ammonium lactate. These activators are employed in catalytic quantities, say from 0.05 to 5 percent based on the total composition. Curing conditions will, of course, vary with the particular application. In general, the carboxyepoxy composition with or without the anhydride is heated at 150° C. to 200° C. and generally at 180° C. to form a cross-linked infusible resin. If a catalyst is preferred, the temperature may be lowered to as low as 125° C., the temperature and time depending upon the size of the casting, varying from 125° C. to 200° C., and one to four hours with a catalyst and three to twelve hours when no catalyst is used.

While the process for preparing hydroxy copolymers in reactive diluents is believed novel, it is also believed that the resulting compositions of matter are new, that is, a hydroxy copolymer-reactive solvent composition which is devoid of conventional volatile solvent having been provided for use in the plastics field.

There is provided a homogenous mixture of 10 to 60 parts of a hydroxy copolymer with 90 to 40 parts by weight, the total being 100, of a strongly polar medium having a viscosity of less than 130 centipoises at 150° C. which is reactive with the hydroxy polymer and, if not, with a cross-linking agent, the medium being an alcohol, carboxylic acid or epoxide boiling above 150° C. and melting below 150° C. These compositions can be made not only by the process of this invention but by conventional means. When conventional polymerization methods are employed, the solvent must be distilled off or otherwise replaced with the reactive medium.

The invention can best be further described by reference to the following examples. The examples are for the purposes of illustration only, and it is intended that no undue limitation be read into the invention by referring to the examples, or the discussions thereof. The epoxide resin employed in the examples (Epoxide 190) is a diepoxide with an epoxide equivalent of 190, prepared by reacting bisphenol and epichlorhydrin employing 10 mols of epichlorhydrin and one mol of bisphenol.

The mold used in the preparation of castings is made by wrapping two 8" by 12" by ¼" glass plates with heavy duty cellophane so that one side of each plate is free of wrinkles. These plates are then assembled, smooth side inward, into a mold by separating the plates with ⅛" aluminum spacers to adjust the cavity thickness using polyvinyl chloride-acetate plastic tubing as a gasket on three of the four edges of the glass plates. The two glass plates are then clamped together using 6 "C" clamps.

EXAMPLE 1

A. Copolymer preparation

| Material | Units | Weight (grams) |
|---|---|---|
| Propylene oxide | 20.1 | 60.3 |
| Methacrylic acid | 29.9 | 89.7 |
| Vinyl toluene | 50.0 | 150.0 |
| Benzyltrimethylammonium chloride (60 percent aqueous solution) | 1.0 | 5.0 |
| Benzoyl peroxide | 2.0 | 6.0 |
| Polyethylene glycol (molecular weight, 300) | | 300.0 |

TABLE 1A

| No. | Copolymer | Copolymer Concentration, percent | Copolymer hydroxyl equivalent | Reactive diluent | Copolymer diluent appearance | Equivalent ratios | | | |
|---|---|---|---|---|---|---|---|---|---|
| | | | | | | Copolymer | Diluent | Anhydride | Epoxide |
| 1A | 50/50 VT/HPA | 50 | 260 | PEG-300 | Flows, clear | 1.0 | 1.73 | 6.09 | 5.09 |
| 1B | 50/50 VT/HPA | 50 | 260 | PEG-300 | do | 1.0 | 1.76 | 3.80 | 3.80 |
| 1C | 50/50 VT/HPA | 50 | 260 | PEG-600 | do | 1.0 | .875 | 3.73 | 3.71 |
| 1D | 50/50 VT/HPA | 50 | 260 | PEG-600 | do | 1.0 | .865 | 2.86 | 2.70 |

VT—Vinyl toluene. HPA—Hydroxy propyl acrylate. PEG—Polyethylene glycol.

TABLE 1B

| No. | Tensile | | Percent elongation | Flexure | | Impact [2] (notched) | Hardness [3] | Percent water absorb. |
|---|---|---|---|---|---|---|---|---|
| | Ult.[1] | Mod. ×10⁶ | | Ult.[1] | Mod. ×10⁶ | | | |
| 1A | 12,300 | .25 | 6.3 | 19,300 | .50 | .63 | 96 M | .1 |
| 1B | 11,800 | .25 | 5.2 | 18,300 | .49 | .57 | 92 M | .2 |
| 1C | 7,100 | .28 | 2.6 | 17,600 | .50 | .52 | 89 M | .2 |
| 1D | 10,000 | .24 | 5.8 | 14,900 | .43 | .82 | 88 M | .4 |

[1] Lb. per in. sq.  [2] Ft. lbs. per in. notch.  [3] Rockwell M.

In a one liter, three-necked, round-bottomed flask equipped with thermometer, agitator, and reflux condenser the above listed materials are combined and heated to reflux temperature (80° C. to 85° C.). The flask contents are held at reflux until the reflux temperature reaches 105° C. at which time a 6.0 grams excess propylene oxide is added to lower the acid value. Reflux of the flask contents is continued until a reflux temperature of 125° C. to 130° C. is reached. The resulting 50 percent solution of the 50/50 vinyl toluene/hydroxy propyl methacrylate copolymer is cooled and poured into a suitable container. The copolymer portion of the composition has an actual acid value of 2 to 4 and a theoretical hydroxyl equivalent of 288, while the hydroxyl copolymer-glycol solution has a theoretical hydroxyl equivalent of 219.

B. Cured composition

In a suitable container 75.9 grams (.385 hydroxyl equivalent) of the hydroxy copolymer-glycol solution and 71.5 grams (.376 epoxide equivalent) of Epoxide 190 are combined with 55.8 grams (.377 anhydride equivalent) of phthalic anhydride and are heated at 110° C. with stirring until all of the phthalic anhydride is in solution. Into the mixture is blended 0.25 gram of dimethylaminomethyl phenol whereupon the mixture is poured into a mold prepared from glass plates, and is heated in a circulating oven for one hour at 100° C. followed by a post-curing of two hours at 150° C. The casting obtained has these physical properties:

Tensile strength _____ 4000 lb./sq. in.
Elongation _____ 2.8 percent.
Impact strength _____ 0.48 ft. lb./in. of notch.
Hardness (Rockwell) _____ 80D.
Water absorption _____ 0.5 percent.

Four additional compositions of 50/50 vinyl toluene/ hydroxy propyl acrylate copolymers each having a hydroxyl equivalent of 260 are prepared as described in the preceding example. Two of these are 50 percent copolymer solutions prepared in a polyethylene glycol mixture having an average molecular weight of 300 and two are prepared in polyethylene glycol having an average molecular weight of 600. The copolymer compositions are then cast between the glass plates in accordance with the preceding example using a cure schedule of one hour at 100° C. and an additional two hours at 150° C. and the equivalent ratios of anhydride and epoxide shown in Table 1A. The properties of the resulting cured castings are given in Table 1B.

EXAMPLE 2

A. Copolymer preparation

| Material | Units | Weight (grams) |
|---|---|---|
| Vinyl toluene | 70.0 | 210.0 |
| Acrylic acid | 16.6 | 49.8 |
| Propylene oxide | 13.4 | [1] 40.2 |
| Benzoyl peroxide | 2.0 | 6.0 |
| Benzyltrimethylammonium chloride (60 percent aqueous solution) | 1.0 | 5.0 |
| Polyethylene glycol (molecular weight, 300) | | 300.0 |

[1] 5 grams in excess of equivalent amount.

As described in the preceding example, the vinyl toluene, acrylic acid, propylene oxide, benzoyl peroxide, benzyl trimethyl ammonium chloride, and polyethylene glycol are heated together in a flask to reflux temperature (90° C. to 95° C.). The contents of the flask are then held at a maximum reflux until the temperature reaches 130° C. The acid value of the solids is determined at this point and if it is found to be above 5, an additional 10 grams of propylene oxide are added and the temperature is held at 130° C. until the acid value is below 2. The flask is then fitted for vacuum distillation and any excess monomer is distilled off at 15 mm. Hg and 127° C. The resulting product is a 50 percent solution of a 70/30 vinyl toluene/hydroxy propyl acrylate copolymer in poylethylene glycol. The copolymer portion of the composition has a theoretical hydroxyl equivalent of 435 while the total copolymer solution has a hydroxyl equivalent of 293.

B. Cured composition

In accordance wtih Part B of Example 1, 79.2 grams of the hydroxy copolymer glycol solution (.301 hydroxyl equivalent of copolymer and .264 hydroxyl equivalent of polyethylene glycol) are combined with 68 grams (.348 epoxide equivalent) of Epoxide 190 and 52.8 grams (.356 anhydride equivalent) of phthalic anhydride. The mixture is heated with stirring at 110° C. until melted. To the solution is added with stirring, 0.25 gram of dimethyl aminomethyl phenol. The resulting blend is cast and heated at 150° C. for thirty minutes followed by a two hour post cure at 180° C. as described in Part B of Example 1, producing a hard, tough, flexible casting.

EXAMPLE 3

| Material | Units | Weight (grams) |
| --- | --- | --- |
| Propylene oxide | 20.1 | [1] 20.1 |
| Methacrylic acid | 29.9 | 29.9 |
| Vinyl toluene | 50.0 | 50.0 |
| Benzoyl peroxide | 2.0 | 2.0 |
| Benzyltrimethylammonium chloride (60 percent aqueous solution) | 1.2 | 2.0 |
| Polypropylene glycol (molecular weight, 1,200) | | 100.0 |

[1] 4.0 grams in excess of equivalent amount.

In accordance with the preceding examples, the vinyl toluene, propylene oxide, methacrylic acid, catalysts, and propylene glycol are heated together in a one liter flask to reflux (83° C.). Reflux is maintained until the temperature of the flask contents reaches 120° C., a period of about three and one-half hours. The resulting product is a 50 percent solution of a 50/50 vinyl toluene/hydroxy propyl methacrylate copolymer in a polypropylene glycol medium. The copolymer portion of the composition has a theoretical hydroxyl equivalent of 288, while the total copolymer solution has a hydroxyl equivalent of 444.

The copolymer solution is cured as described in Part B of Example 2, producing a thermosetting resin having very good toughness, flexibility, and resistance to impact.

EXAMPLE 4

A. *Copolymer preparation*

Material: Weight (grams)
　　Propylene oxide _____ [1] 43.6
　　Acrylic acid _____ 54.0
　　Vinyl toluene _____ 97.6
　　Benzoyl peroxide _____ 4.0
　　Benzyltrimethylammonium chloride (60 percent aqueous solution) _____ 4.1
　　Polyethylene glycol (molecular weight— 600) _____ 200.0

[1] Plus 24.8 grams excess of equivalent amount.

In a one liter, three-necked, round-bottom flask equipped with thermometer, agitator, and reflux condenser the above listed materials are combined and heated to reflux temperature (75° C. to 80° C.). The flask contents are held at reflux for about six and one-half hours at which time the reflux temperature is 98° C. The course of the reaction is followed by determination of the acid value based on solids. At the end of six and one-half hours reflux, the determined acid value in this case is 2.0. The flask is then fitted for vacuum distillation, and the excess propylene oxide is distilled off at 15 mm. Hg to a temperature of 98° C. After all excess propylene oxide is removed, the 50 percent solution of the 50/50 vinyl toluene/hydroxy propyl acrylate copolymer is cooled to room temperature and poured in a suitable container for storage. The copolymer portion has a theoretical hydroxyl equivalent of 260, while the total copolymer solution has a theoretical hydroxyl equivalent of 520.

B. *Cured composition*

In a suitable container, 29.3 grams (0.105 hydroxyl equivalent) of the hydroxy copolymer glycol solution, and 39.7 grams (0.209 epoxide equivalent) of Epoxide 190 are combined with 31.0 grams (0.419 anhydride equivalent) of phthalic anhydride and are heated at 100° C. to 110° C. with stirring until all of the phthalic anhydride is in solution. Into the mixture is blended 0.25 gram of dimethylaminomethyl phenol whereupon the mixture is poured into the mold prepared from glass plates and is heated in a circulating oven for one hour at 125° C. followed by a post cure of two hours at 180° C. The casting obtained has these physical properties:

Tensile strength _____ 7100 lb./sq. in.
Elongation _____ 2.6 percent
Flexural strength _____ 17,600 lb./sq. in.
Impact strength _____ 0.52 ft. lb./in. of notch.
Hardness (Rockwell M) _____ 89.
Water absorption _____ 0.2 percent.

As described in the preceding paragraph, 17.5 grams of the 50 percent copolymer solution of this example (0.034 hydroxyl equivalent of the copolymer and 0.029 hydroxyl equivalent of the glycol) are combined with 14.3 grams (0.193 anhydride equivalent) of phthalic anhydride, 18.3 grams (0.096 epoxide equivalent) of Epoxide 190 and 0.25 gram of dimethylaminomethyl phenol. The mixture is poured into the mold prepared from glass plates and is heated in a circulating oven for thirty minutes at 150° C. followed by a two hour post cure at 180° C. The cured casting has these physical properties:

Tensile strength _____ 10,000 lbs./sq. in.
Elongation _____ 5.8 percent
Flexural strength _____ 14,900 lb./sq. in.
Impact strength _____ 0.82 ft. lb./in. of notch.
Hardness (Rockwell M) _____ 88.
Water absorption _____ 0.4 percent.

EXAMPLE 5

Material: Weight (grams)
　　Vinyl toluene _____ 64.0
　　Hydroxy ethyl methacrylate _____ 16.0
　　Benzoyl peroxide _____ 1.6
　　Azelaic acid _____ 120.0

In a 500 milliliter flask equipped with thermometer and agitator, the 120.0 grams of azelaic acid is heated with stirring to 130° C. At this temperature, a monomer-catalyst solution, having been prepared by mixing together the vinyl toluene, hydroxy ethyl methacrylate and benzoyl peroxide, is added to the melted azelaic acid over a period of thirty minutes at a temperature of 120° C. to 130° C. After the addition is complete, the flask contents are heated for three hours at a temperature of 120° C. to 150° C. The resulting product is an 80/20 vinyl toluene/hydroxy ethyl methacrylate copolymer in azelaic acid. The product is a waxy solid. The copolymer portion of the product has a hydroxyl equivalent of 650.

EXAMPLE 6

| Material | Units | Weight (grams) |
| --- | --- | --- |
| Methyl methacrylate | 80.0 | 240.0 |
| 2-hydroxyethyl vinyl sulfide | 20.0 | 60.0 |
| Butyl glycidyl ether | | 300.0 |
| Benzoyl peroxide | 2.5 | 7.5 |

In a one liter, three-necked, round-bottomed flask equipped with thermometer, agitator, dropping funnel, and reflux condenser, 300 grams of butyl glycidyl ether are heated to 120° C. The monomer-catalyst solution, prepared by mixing together the methyl methacrylate, the 2-hydroxyethyl vinyl sulfide, and 6 grams of the benzoyl peroxide is then added to the heated epoxide solvent through the dropping funnel over a period of one hour, while the temperature of the flask contents is held at 120° C. After all of the monomer-catalyst solution is added, the flask contents are heated at 120° C. for an additional two hours. The charge is cooled to 50° C., 1.5 grams of benzoyl peroxide are added, and the reaction mixture is heated at 120° C. for four more hours. The resulting composition is a 50 percent solution of 80/20 methyl methacrylate/2-hydroxyethyl vinyl sulfide copolymer dissolved in the butyl glycidyl ether. The copolymer component of the solution has a theoretical hydroxyl equivalent of 520, while the total copolymer solution has a theoretical hydroxyl equivalent of 1040. The solvent portion of the copolymer solution has a theoretical epoxide equivalent of 130, while the total solution has a theoretical epoxide equivalent of 260.

EXAMPLE 7

| Material | Units | Weight (grams) |
|---|---|---|
| Methyl methacrylate | 70.0 | 140.0 |
| 2-hydroxy propyl acrylate | 30.0 | 60.0 |
| Epoxide A | | 300.0 |
| Benzoyl peroxide | 2.5 | 5.0 |

Epoxide A is substantially the diglycidyl ether of bisphenol, having an epoxide equivalent of 190, prepared by reacting ten mols of epichlorhydrin with one mol of bisphenol and dehydrohalogenating the product.

In a one liter, three-necked, round-bottomed flask equipped with theremometer, agitator, reflux condenser and dropping funnel 300 grams of Epoxide A are heated to 120° C. The monomer-catalyst solution, prepared by mixing together the methyl methacrylate, 2-hydroxy propyl acrylate, and 4.0 grams of benzoyl peroxide, is then added to the heated epoxide solvent through the dropping funnel during the ensuing seventy minutes at a temperature of 120° C. After all of the monomer-catalyst solution is added, the flask contents are heated at 120° C. for an additional hour. The charge is cooled to 80° C., one gram of benzoyl peroxide is added, and the reaction mixture is heated at 120° C. for three more hours producing a very viscous, non-flowing, resinous material when cooled to room temperature. The resulting composition is a 40 percent solution of 70/30 methyl methacrylate/2-hydroxypropyl acrylate copolymer dissolved in the Epoxide A. The copolymer portion of the solution has a theoretical hydroxyl equivalent of 433, while the total copolymer solution has a theoretical hydroxyl equivalent of 1083. The solvent portion of the copolymer solution has a theoretical epoxide equivalent of 190, while the total copolymer solution has a theoretical epoxide equivalent of 317.

EXAMPLE 8

| Material | Units | Weight (grams) |
|---|---|---|
| Butyl acrylate | 80.0 | 240.0 |
| 2-hydroxyethyl methacrylate | 20.0 | 60.0 |
| Lauric acid | | 300.0 |
| Benzoyl peroxide | 2.5 | 7.5 |

In accordance with Example 7, 300 grams of lauric acid are heated to 120° C. The monomer-catalyst solution, prepared by mixing together the butyl acrylate, the 2-hydroxyethyl methacrylate and 6.0 grams of benzoyl peroxide, is then added to the heated acid solvent through the dropping funnel over a period of seventy-five minutes at a temperature of 120° C. After all of the monomer-catalyst solution is added, the flask contents are heated at 120° C. for an additional two hours. The charge is cooled to 80° C., 1.5 grams of benzoyl peroxide are added, and the reaction mixture is heated at 120° C. for four more hours. The resulting composition is a 50 percent solution of 80/20 butyl acrylate/2-hydroxyethyl methacrylate. The copolymer portion of the solution has a theoretical hydroxyl equivalent of 650, while the total copolymer solution has a theoretical hydroxyl equivalent of 1300. The solvent portion of the copolymer solution has a theoretical carboxyl equivalent of 200, while the total copolymer solution has a theoretical carboxyl equivalent of 400.

EXAMPLE 9

| Material | Units | Weight (grams) |
|---|---|---|
| Methyl methacrylate | 60.0 | 180.0 |
| Acrylamide | 20.0 | 60.0 |
| 2-hydroxypropyl methacrylate | 20.0 | 60.0 |
| Polyethylene glycol (molecular weight, 300) | | 300.0 |
| Benzoyl peroxide | 2.5 | 7.5 |

Following the procedure of Example 7, 300 grams of polyethylene glycol are heated to 120° C. The monomer-catalyst solution, prepared by mixing together the methyl methacrylate, the acrylamide, the 2-hydroxypropyl methacrylate, and 6.0 grams of benzoyl peroxide is then added to the heated glycol solvent through the dropping funnel over a period of eighty minutes at a temperature of 120° C. After all of the monomer-catalyst solution is added, the flask contents are heated at 120° C. for an additional two hours. The charge is cooled to 60° C., 1.5 grams of benzoyl peroxide are added and the reaction mixture is heated at 120° C. for four more hours. The resulting composition is a 50 percent solution of 60/20/20 methyl methacrylate/acrylamide/2 - hydroxypropyl methacrylate copolymer dissolved in polyethylene glycol. The copolymer component of the solution has a theoretical hydroxyl equivalent of 720; the solvent portion of the copolymer solution has a theoretical hydroxyl equivalent of 150; while the total copolymer solution has a theoretical hydroxy equivalent of 435.

EXAMPLE 10

| Material | Units | Weight (grams) |
|---|---|---|
| Vinyl toluene | 75.0 | 150.0 |
| 2-hydroxypropyl methacrylate | 25.0 | 50.0 |
| Benzoyl peroxide | 2.50 | 5.0 |
| 3,4-epoxy-6-methylcyclohexyl-methyl-3,4-epoxy-6-methyl-cyclohexane carboxylate (Epoxide B) | | 300.0 |

In a one liter, 3-necked round-bottomed flask equipped with thermometer, agitator, dropping funnel and reflux condenser, 300 grams of Epoxide B are heated to 120° C. The monomer-catalyst solution, prepared by mixing together the vinyl toluene, the 2-hydroxypropyl methacrylate, and 4 grams of the benzoyl peroxide, is then added to the heated epoxide solvent through the dropping funnel over a period of one hour, while the temperature of the flask contents is held at 120° C. After all of the monomer-catalyst solution is added, the flask contents are heated at 120° C. for an additional two hours. The charge is cooled to 60° C., one gram of benzoyl peroxide is added, and the reaction mixture is heated at 120° C. for four more hours. The resulting composition is a 40 percent solution of a 75/25 vinyl toluene/2-hydroxypropyl methacrylate copolymer dissolved in the Epoxide B. The copolymer component of the solution has a theoretical hydroxyl equivalent of 576, while the total copolymer solution has a theoretical hydroxyl equivalent of 1440. The solvent portion of the copolymer solution has a theoretical epoxide equivalent of 150, while the total solution has a theoretical epoxide equivalent of 250.

It is understood that while the preferred method of preparing the composition is to prepare it in a reactive solvent in accordance with this invention as described hereinbefore, it can be made in a volatile solvent to be distilled off later. This aspect of the invention is illustrated as follows:

EXAMPLE 11

| Material | Units | Weight (grams) |
|---|---|---|
| Propylene oxide | 24.2 | 48.4 |
| Acrylic acid | 27.0 | 54.0 |
| Styrene | 48.8 | 97.6 |
| Benzoyl peroxide | 2.0 | 4.0 |
| Benzyltrimethylammonium chloride (60 percent aqueous solution) | 1.3 | 4.3 |
| Methyl isobutyl ketone | | 200.0 |

In a one liter flask equipped with thermometer, agitator, reflux condenser, and dropping funnel, the propylene oxide, acrylic acid, styrene, benzoyl peroxide, benzyltrimethylammonium chloride, and methyl isobutyl ketone are heated together to reflux temperature (75° C. to 80° C.). The contents of the flask are then held at reflux for nine hours. During this period, the reflux temperature climbs to 101° C. The acid value of the solids is determined at this point and is found to be below one. The charge is then cooled to room temperature and 200 grams of Epoxide 190 are added. The flask is fitted for vacuum distillation and 212 grams of methyl isobutyl ketone and other volatile materials present are vacuum distilled off to 140° C. using a water aspirator vacuum. The resulting product is a 50 percent solution of 50/50 styrene/hydroxypropyl acrylate copolymer dissolved in Epoxide 190. The copolymer component of the solution has a theoretical hydroxyl equivalent of 260, while the total copolymer solution has a theoretical hydroxyl equivalent of 520. The solvent portion of the copolymer solution has a theoretical epoxide equivalent of 190, while the total copolymer solution has a theoretical epoxide equivalent of 380.

It has been pointed out that there are many ways of curing the compositions prepared in accordance with this invention, a wide variety of catalysts or converters being available. These and other ramifications and variations will occur to those skilled in the art. Such obvious modifications are deemed to be within the scope of this invention.

What is claimed is:

1. A process for the preparation of a hydroxy copolymer solution devoid of solvent boiling below 150° C. and capable of being readily cross-linked which comprises polymerizing, at a temperature of from 60° C. to about 150° C., a solution comprising
   (A) an unsaturated hydroxy monomer selected from the group consisting of monoethylenically unsaturated alcohols, hydroxyalkyl vinyl sulfides and hydroxyalkyl esters of α,β-ethylenically unsaturated carboxylic acids of not over four carbon atoms, the alkyl groups of said sulfides and esters having not more than ten carbon atoms,
   (B) a different monoethylenically unsaturated monomer copolymerizable with said (A), and
   (C) as the sole polymerization solvent, a carboxylic acid,
   said (C)
   (1) being a solvent for and non-reactive with said (A), said (B) and said hydroxy copolymer under the polymerization conditions used,
   (2) being present in an amount sufficient to dissolve said (A), said (B) and said hydroxy copolymer at the polymerization temperature,
   (3) being saturated or containing unsaturation which is non-reactive under the polymerization conditions used,
   (4) having a boiling point of at least 150° C.,
   (5) having a viscosity not exceeding 130 centipoises at the polymerization temperature, and
   (6) being capable of entering the curing reaction when said hydroxy copolymer is cured.

2. A process as described in claim 1 wherein polymerization is effected using a vinyl polymerization catalyst.

3. A process as described in claim 1 wherein said (A) is 2-hydroxyethyl acrylate.

4. A process as described in claim 1 wherein said (A) is 2-hydroxyethyl methacrylate.

5. A process as described in claim 1 wherein said (A) is 2-hydroxypropyl acrylate.

6. A process as described in claim 1 wherein said (A) is 2-hydroxypropyl methacrylate.

7. A process as described in claim 1 wherein said (A) is 2-hydroxyethyl methacrylate, said (B) is vinyl toluene and said (C) is azelaic acid.

8. A process as described in claim 1 wherein said (A) is 2-hydroxyethyl methacrylate, said (B) is butyl acrylate and said (C) is lauric acid.

9. A process for the preparation of a cured hydroxy copolymer which comprises adding to an uncured hydroxy copolymer solution prepared as described in claim 1 two equivalents of a polyepoxide and 1–2 equivalents of a polycarboxylic acid anhydride for each 0.2–0.8 equivalent of said hydroxy copolymer present, and heat-curing the resulting composition.

References Cited by the Examiner

UNITED STATES PATENTS 2,828,220  3/1958  McWherter et al.  260—78.5

OTHER REFERENCES

Lee et al.: "Epoxy Resins," McGraw-Hill (1957), pp. 35 and 36.

LEON J. BERCOVITZ, *Primary Examiner.*

DONALD E. CZAJA, *Examiner.*

R. A. WHITE, *Assistant Examiner.*